US012657840B2

(12) United States Patent
Burns et al.

(10) Patent No.: US 12,657,840 B2
(45) Date of Patent: *Jun. 16, 2026

(54) ENVIRONMENT APPLICATION MODEL

(71) Applicant: Apple Inc., Cupertino, CA (US)

(72) Inventors: Aaron M. Burns, Sunnyvale, CA (US); Alexis H. Palangie, Palo Alto, CA (US); Nathan Gitter, Cupertino, CA (US); Pol Pla I. Conesa, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/374,807

(22) Filed: Sep. 29, 2023

(65) Prior Publication Data

US 2024/0029371 A1     Jan. 25, 2024

Related U.S. Application Data

(63) Continuation of application No. 17/732,837, filed on Apr. 29, 2022, now Pat. No. 11,776,225, which is a (Continued)

(51) Int. Cl.
| | |
|---|---|
| *G06T 19/00* | (2011.01) |
| *G06F 3/04815* | (2022.01) |
| *G06T 19/20* | (2011.01) |

(52) U.S. Cl.
CPC ........ G06T 19/006 (2013.01); G06F 3/04815 (2013.01); G06T 19/20 (2013.01)

(58) Field of Classification Search
CPC ..... G06T 19/006; G06T 19/20; G06T 15/506; G06T 2219/2012; G06F 3/04815; G06F 3/011; G06F 8/65; G06F 21/629
See application file for complete search history.

(56) References Cited

U.S. PATENT DOCUMENTS

| | | | | |
|---|---|---|---|---|
| 8,683,388 | B2 * | 3/2014 | Elber | ...................... A63F 13/00 |
| | | | | 715/848 |
| 9,317,972 | B2 | 4/2016 | Foruntanpour et al. | |

(Continued)

FOREIGN PATENT DOCUMENTS

| | | |
|---|---|---|
| CN | 107430790 A | 12/2017 |
| CN | 108064364 A | 5/2018 |

(Continued)

OTHER PUBLICATIONS

"Limit an iOS Device to Running a Single App—Learning in Hand with Tony Vincent"; Sep. 19, 2012; pp. 1-3.

(Continued)

*Primary Examiner* — Motilewa Good-Johnson
(74) *Attorney, Agent, or Firm* — Thompson Hine LLP

(57) ABSTRACT

Various implementations disclosed herein include devices, systems, and methods that enable presenting environments including visual representations of multiple applications. In one implementation, a method includes presenting a view of an environment at an electronic device on a display. The view includes visual representations of a plurality of applications. The method further includes determining to provide a first application with access to a control parameter. The control parameter is configured to modify at least a portion of the view of the environment with virtual content, and the portion of the view includes at least a portion of content outside of a view of a visual representation associated with the first application. The method further includes restricting access to the control parameter by other applications which prevents the other applications from modifying the at least the portion of the view of the environment via the control parameter.

19 Claims, 6 Drawing Sheets

300

Related U.S. Application Data continuation of application No. 17/177,458, filed on Feb. 17, 2021, now Pat. No. 11,354,867.

(60) Provisional application No. 62/984,853, filed on Mar. 4, 2020.

(56) References Cited

U.S. PATENT DOCUMENTS

| | | | | |
|---|---|---|---|---|
| 9,430,130 | B2 * | 8/2016 | Matthews | G06F 9/451 |
| 9,430,991 | B2 * | 8/2016 | Mazzola | G09G 5/026 |
| 9,535,597 | B2 * | 1/2017 | Wong | G06F 3/04845 |
| 10,353,532 | B1 * | 7/2019 | Holz | G06F 3/04847 |
| 10,650,541 | B2 | 5/2020 | Stall et al. | |
| 10,656,720 | B1 * | 5/2020 | Holz | G06F 3/017 |
| 10,726,625 | B2 | 7/2020 | Kraver | |
| 10,955,987 | B2 | 3/2021 | Alexander | |
| 11,036,364 | B2 * | 6/2021 | Zurmoehle | G06F 3/04845 |
| 11,087,538 | B2 | 8/2021 | Qian et al. | |
| 11,354,867 | B2 * | 6/2022 | Burns | G06F 3/011 |
| 11,567,627 | B2 | 1/2023 | Day et al. | |
| 11,575,535 | B2 | 2/2023 | Garg et al. | |
| 11,776,225 | B2 * | 10/2023 | Burns | G06T 15/506 |
| | | | | 345/633 |
| 2007/0250787 | A1 * | 10/2007 | Kawahara | G06F 9/451 |
| | | | | 715/782 |
| 2010/0103172 | A1 | 4/2010 | Purdy, Sr. | |
| 2012/0131495 | A1 | 5/2012 | Goossens et al. | |
| 2013/0004136 | A1 * | 1/2013 | Brower | G02B 6/4455 |
| | | | | 29/428 |
| 2013/0054319 | A1 | 2/2013 | Woods et al. | |
| 2014/0092115 | A1 | 4/2014 | Mazzola | |
| 2014/0359475 | A1 * | 12/2014 | Venkatesh | H04M 1/72448 |
| | | | | 715/747 |
| 2015/0074506 | A1 * | 3/2015 | Dunn | G06T 19/006 |
| | | | | 715/230 |
| 2016/0048725 | A1 | 2/2016 | Holz et al. | |
| 2016/0210467 | A1 * | 7/2016 | Mehrab | G06F 21/6245 |
| 2016/0217615 | A1 | 7/2016 | Kraver | |
| 2016/0321449 | A1 * | 11/2016 | Surti | G06F 9/54 |
| 2017/0048337 | A1 | 2/2017 | Fraccaroli | |
| 2017/0111368 | A1 * | 4/2017 | Hibbert | H04L 63/102 |
| 2018/0181199 | A1 | 6/2018 | Harvey et al. | |
| 2018/0330515 | A1 * | 11/2018 | Stall | G06T 19/003 |
| 2018/0365898 | A1 | 12/2018 | Costa | |
| 2019/0073984 | A1 | 3/2019 | Mazzola | |
| 2019/0107990 | A1 * | 4/2019 | Spivack | G06T 11/60 |
| 2019/0114061 | A1 | 4/2019 | Daniels et al. | |
| 2019/0188917 | A1 * | 6/2019 | Cho | G06T 15/506 |
| 2019/0260870 | A1 | 8/2019 | Spivack et al. | |
| 2019/0295320 | A1 | 9/2019 | Ghatak et al. | |
| 2019/0362528 | A1 | 11/2019 | De Luca et al. | |
| 2020/0019781 | A1 | 1/2020 | Smith et al. | |
| 2020/0081524 | A1 | 3/2020 | Schmidt et al. | |
| 2020/0082632 | A1 * | 3/2020 | Burns | G02B 27/0172 |
| 2020/0320794 | A1 * | 10/2020 | Huang | G06F 3/1454 |
| 2020/0364915 | A1 * | 11/2020 | Ruth | G06F 21/604 |
| 2020/0372718 | A1 | 11/2020 | Molyneaux et al. | |
| 2021/0056756 | A1 | 2/2021 | Xin et al. | |

FOREIGN PATENT DOCUMENTS

| | | |
|---|---|---|
| CN | 108628595 A | 10/2018 |
| WO | 2018204879 A1 | 11/2018 |
| WO | 2019214789 A1 | 11/2019 |
| WO | WO 2020034863 | 2/2020 |

OTHER PUBLICATIONS

European Patent Office, Search Report and Opinion, European Patent Application No. 21160700.7, 10 pages, Jul. 27, 2021.

European Patent Office, Examination Report (Communication pursuant to Article 94(3) EPC), European Patent Application No. 21160700.7, 9 pages, Nov. 2, 2022.

China National Intellectual Property Administration, Patent Search Report (w/English Translation) which pertains to Chinese Patent Application No. 2021102124935. 5 pgs.

The Patent Office of the People's Republic of China, Notification of the First Office Action (with partial English translation), Chinese Patent Application No. 2021102124935, 15 pages, Mar. 8, 2024.

* cited by examiner

300

400

900

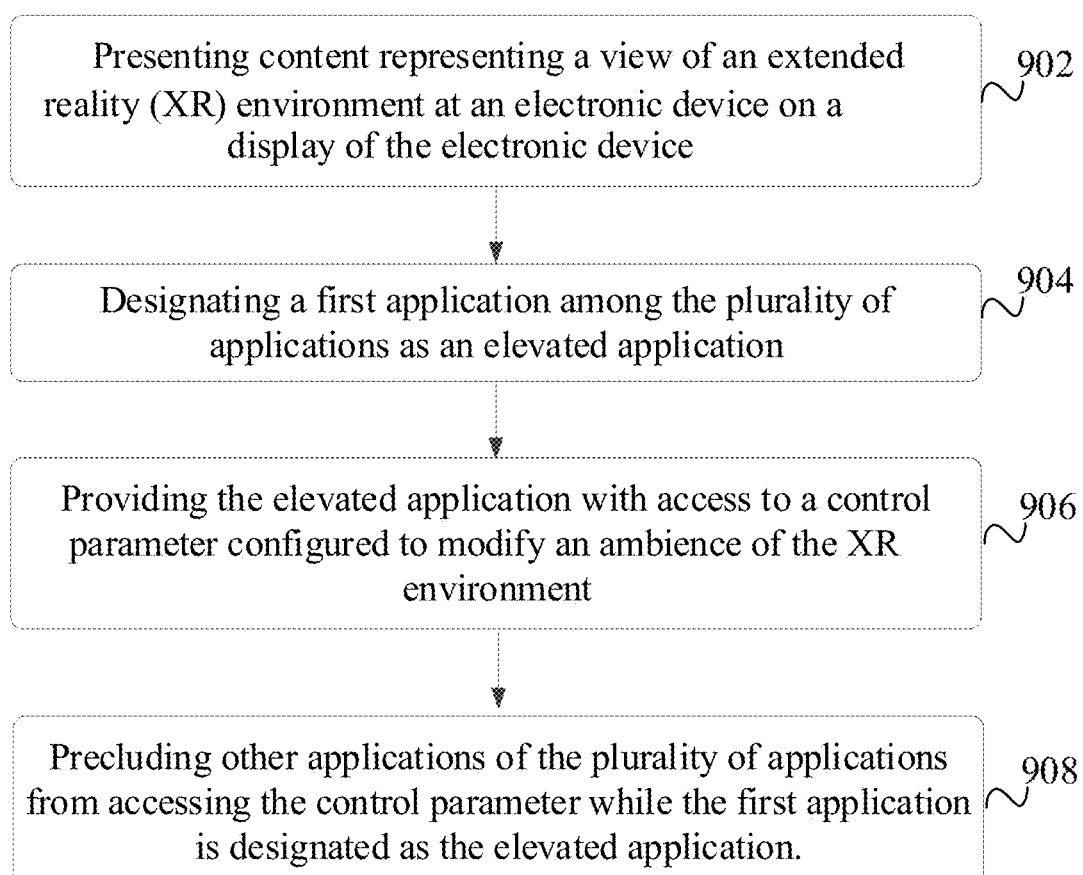

Presenting content representing a view of an extended reality (XR) environment at an electronic device on a display of the electronic device — 902

Designating a first application among the plurality of applications as an elevated application — 904

Providing the elevated application with access to a control parameter configured to modify an ambience of the XR environment — 906

Precluding other applications of the plurality of applications from accessing the control parameter while the first application is designated as the elevated application. — 908

FIG. 9

ENVIRONMENT APPLICATION MODEL

CROSS-REFERENCE TO RELATED APPLICATION

This application is a continuation of U.S. application Ser. No. 17/732,837, filed on Apr. 29, 2022, which is a continuation of U.S. patent application Ser. No. 17/177,458 filed on Feb. 17, 2021, and which claims the benefit of U.S. Provisional Application Ser. No. 62/984,853 filed Mar. 4, 2020, each of which is incorporated herein by reference in its entirety.

TECHNICAL FIELD

The present disclosure generally relates to the display of extended reality (XR) environments, and in particular, to techniques for presenting views of XR environments comprising visual representations of multiple applications.

BACKGROUND

Various devices are used to provide users with XR environments. The content of such XR environments may be experienced by a user using a mobile device, head-mounted device ("HMD"), or other device that presents the visual or audio features of the content. The experience can be, but need not be, immersive, e.g., providing most or all of the visual or audio content experienced by the user. The content can include pass-through video (e.g., in which real-world content is captured by a camera and displayed on a display with additional content) or optical-see-through (e.g., in which real-world content is viewed directly or through glass and supplemented with displayed additional content).

In some instances, the content can also include visual representations of multiple applications. Some devices and software programs facilitate the display of such content that includes visual representations of multiple applications. However, these devices and software programs do not provide sufficient features for resolving any conflicts arising among the multiple applications concerning views of XR environments.

SUMMARY

Various implementations disclosed herein relate to techniques for customizing an ambience of a XR environment presented to a user. In one implementation, a method includes presenting content representing a view of an XR environment at an electronic device on a display of the electronic device. The XR environment comprising visual representations corresponding to a plurality of applications. A first application among the plurality of applications is designated as an elevated application. The elevated application is provided with access to a control parameter configured to modify an ambience of the XR environment. Other applications of the plurality of applications are precluded from accessing the control parameter while the first application is designated as the elevated application.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 9 is a flow-chart illustrating an example of a method for presenting views of XR environments comprising visual representations of multiple applications.

Figure 1:
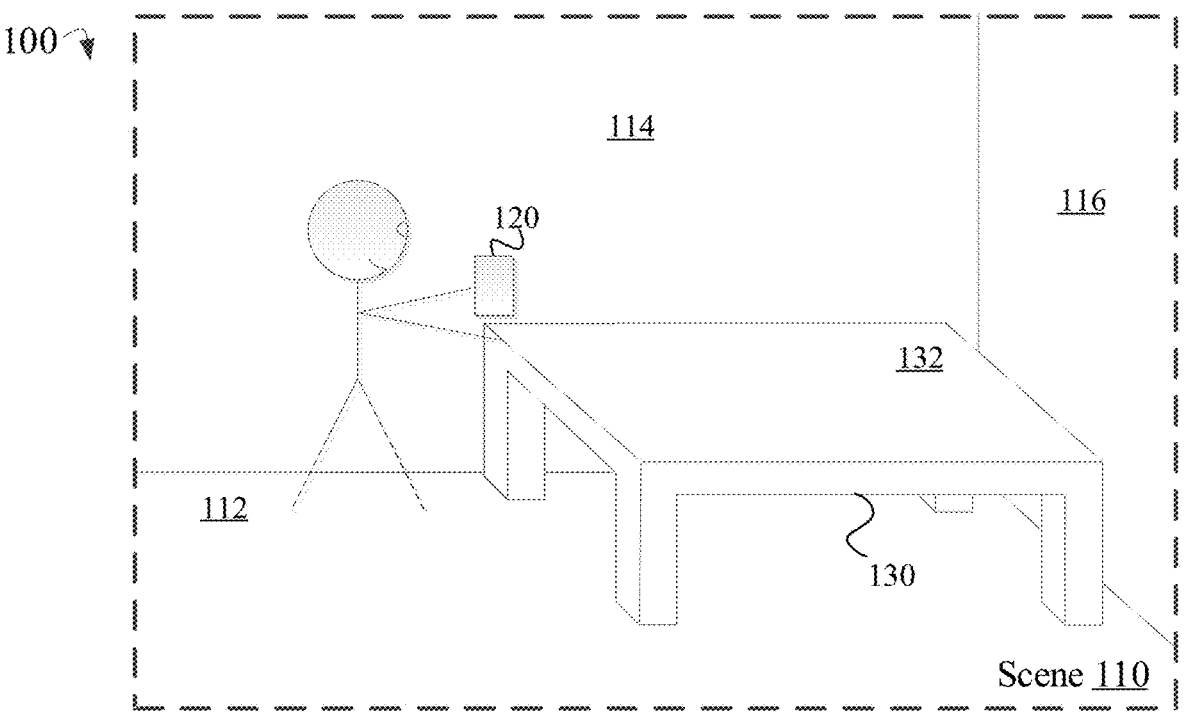
FIG. 1 illustrates a functional block diagram of an event sensor, in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Referring to FIG. 1, an example operating environment 100 for implementing aspects of the present disclosure is illustrated and designated generally 100. In general, operating environment 100 illustrates an electronic device 120 involved in the display of two-dimensional (2-D) content or three-dimensional (3-D) content, including but not limited to, an extended reality (XR) environment to a user. an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect rotational head movement and, in response, adjust graphical content and an acoustic field presented to the person in a manner similar to how such views and sounds would change in a physical environment. As another example, the XR system may detect rotational or translational movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), adjustments to character-istic(s) of graphical content in an XR environment may be made in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or trans-lucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projec-tion-based systems may employ retinal projection technol-ogy that projects graphical images onto a person's retina. Projection systems also may be configured to project virtual objects into the physical environment, for example, as a hologram or on a physical surface.

In some implementations, the electronic device 120 is a handheld electronic device (e.g., a smartphone or a tablet) configured to present content representing a view (e.g., view 200 of FIG. 2) of an XR environment to a user. In some implementations, the electronic device 120 is a head-mounted device (HMD) that a user wears. Such an HMD may enclose the field-of-view of the user. In some imple-mentations, an HMD is worn is a way that one or more screens are positioned to display content representing a view of an XR environment in the field-of-view of the user. In some implementations, electronic device 120 is con-figured to interact with a controller (not shown) separate from electronic device 120 to present content representing a view of an XR environment to a user. In some implemen-tations, the controller includes a suitable combination of software, firmware, or hardware to facilitate presentation of content representing a view of an XR environment to a user. In some implementations, the controller is a computing device communicatively coupled to electronic device that is local or remote relative to a physical environment (e.g., scene 110) proximate to electronic device 120. In one example, the controller is a local server located within a physical environment proximate to electronic device 120. In another example, the controller is a remote server (e.g., a cloud server, central server, etc.) located outside of the physical environment proximate to electronic device 120. In some implementations, the controller is communicatively coupled with the electronic device 120 via one or more wired or wireless communication channels (e.g., BLU-ETOOTH, IEEE 802.11x, IEEE 802.16x, IEEE 802.3x, etc.).

Figure 2:
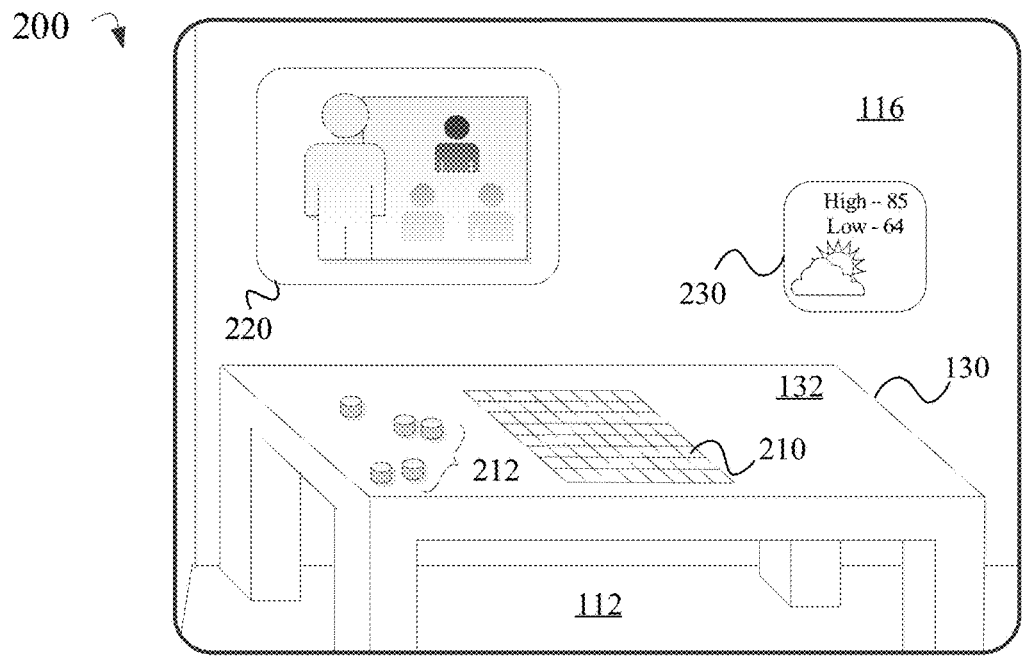
FIG. 2 illustrates example two-dimensional ("2-D") tiles of pixel events that an event sensor may output for further processing, in accordance with some implementations.

FIG. 2 is an example of presenting content 200 represent-ing an XR environment on a display (e.g., the one or more displays 1006 of FIG. 10) of electronic device 120. The XR environment represented by content 200 comprises depic-tions of physical elements within scene 110, such as a floor 112, a first wall 114, a second wall 116, and a table 130. Content 200 further comprises depictions of virtual elements corresponding to multiple applications, such as a represen-tation 210 of a checkers application, a representation 220 of a media application, and a representation 230 of a weather application. Each representation depicted in FIG. 2 com-prises computer-generated content associated with or pro-vided by a different application among the multiple appli-cations. For example, representation 210 comprises computer-generated content depicting a virtual checkers board associated with the checkers application and repre-sentation 230 comprises computer-generated content indica-tive of weather conditions provided by the weather appli-cation.

In one implementation, the XR environment represented by content 200 provides a "virtual desktop" comprising visual representations corresponding to multiple, separately executing applications. In this implementation, the virtual elements comprising those visual representations are posi-tioned or configured in the XR environment such that they are perceived to coexist with physical elements (e.g., table 130) within the XR environment. For example, representa-tion 210 and associated computer-generated content 212 depicting virtual checkers are positioned in the XR envi-ronment represented by content 200 such that those virtual elements are perceived as existing on a horizontal surface 132 of table 130.

Content 200 generally corresponds to a view of an XR environment that a user of electronic device 120 may perceive before electronic device 120 modifies an ambience of the XR environment, as described in greater detail below. "Ambience" generally refers to a character and/or atmo-sphere of an XR environment that a user perceiving the XR environment associates with the XR environment. Various factors contribute to such ambience. For example, reducing a brightness level associated with an XR environment may contribute to a user associating that environment with a relaxing atmosphere whereas increasing the brightness level may contribute to the user associating the XR environment with an energetic atmosphere. As another example, spatial-izing ambient sound for light rain all around a user in an XR environment may contribute to the user associating that environment with a relaxing atmosphere whereas spatializing ambient sound for smashing glass and collapsing structures may contribute to the user associating the XR environment with a threatening atmosphere.

In various implementations, an ambience unit (e.g., ambience unit 1042 of FIG. 10) facilitates customization of an ambience of an XR environment presented to a user. To that end, the ambience unit exposes one or more control parameters for modifying the ambience of the XR environment to multiple applications associated with or providing content corresponding to the XR environment. An application interface unit (e.g., application interface unit 1044) minimizes a likelihood that such control parameters receive conflicting inputs or commands by arbitrating control access to the one or more control parameters among the multiple applications.

One aspect of arbitrating control access involves the application interface unit designating a particular application among the multiple applications as an elevated application. In one implementation, designating a particular application as an elevated application comprises the application interface unit identifying the particular application based on one or more identification criterion. Such identification criterion may include: a default configuration, a priority setting, a user preference, a user input, a characteristic of the particular application, a current context of the XR environment, a current context of a physical environment proximate to electronic device 120, or a combination thereof.

Upon designating the particular application as the elevated application, the application interface unit provides the particular application with access to a control parameter configured to modify an ambience of the XR environment. While the particular application is designated as the elevated application, the application interface unit restricts or precludes other applications among the multiple applications from accessing the control parameter. For example, the application interface unit may provide the particular application with read-write access to the control parameter while providing the other applications with no access or read-only access to the control parameter. In one implementation, an elevated application is provided with exclusive access to the control parameter. In one implementation, any conflicts arising among the multiple applications related to the control parameter are resolved based on which particular application among the multiple applications is designated as the elevated application.

By providing an elevated application with access to a control parameter, the application interface unit enables the elevated application to interact with the ambience unit to change a value of the control parameter based on user input received via the elevated application. AN XR content creation unit (e.g., XR content creation unit 1046 of FIG. 10) detects changes to the value of the control parameter and modifies the ambience of the XR environment accordingly. As illustrated by comparing FIG. 2 with any of FIGS. 3-4, the control parameter to which the elevated application receives access may modify the ambience of the XR environment in various ways.

In one implementation, designating the particular application as the elevated application alters routing decisions of a user input detection process concerning user input among the multiple applications. For example, the application interface unit may designate a first application among the multiple applications as the elevated application. In this example, the user input detection process may route user input (e.g., gaze tracking data, selection gesture data, and the like) to a second application of the multiple applications prior to the first application being designated as the elevated application. However, subsequent to the first application being designated as the elevated application, the user input detection process may route such user input to the first application. In one implementation, the application interface unit comprises the user input detection process.

Figure 3:
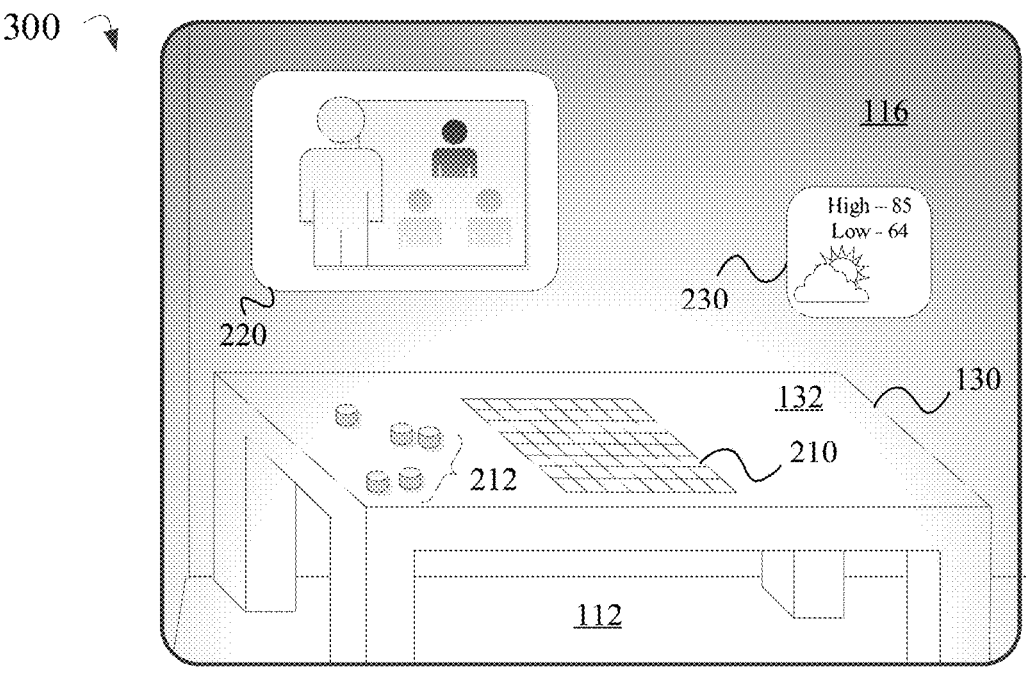
FIG. 3 is a block diagram of an example head-mounted device (HMD) in accordance with some implementations.

A comparison between FIGS. 2 and 3 illustrates an example in which the elevated application receives access to a control parameter that modifies the ambience of the XR environment by adjusting a lighting condition of the XR environment. In this example, the application interface unit may designate the media application associated with representation 220 as the elevated application while presenting content 200 of FIG. 2. Upon designating the media application as the elevated application, the application interface unit provides the media application with access to the control parameter that adjusts the lighting condition of the XR environment.

In FIG. 2, a value of the control parameter may define a first state in which the lighting condition of the XR environment comprises a maximum brightness level. User input received via the media application may change that value of the control parameter to a value that defines a second state in which the lighting condition of the XR environment comprises a minimum brightness level. Responsive to detecting that change to the value of the control parameter, the XR creation unit generates content 300 in which the lighting condition of the XR environment is adjusted to the second state.

Figure 4:
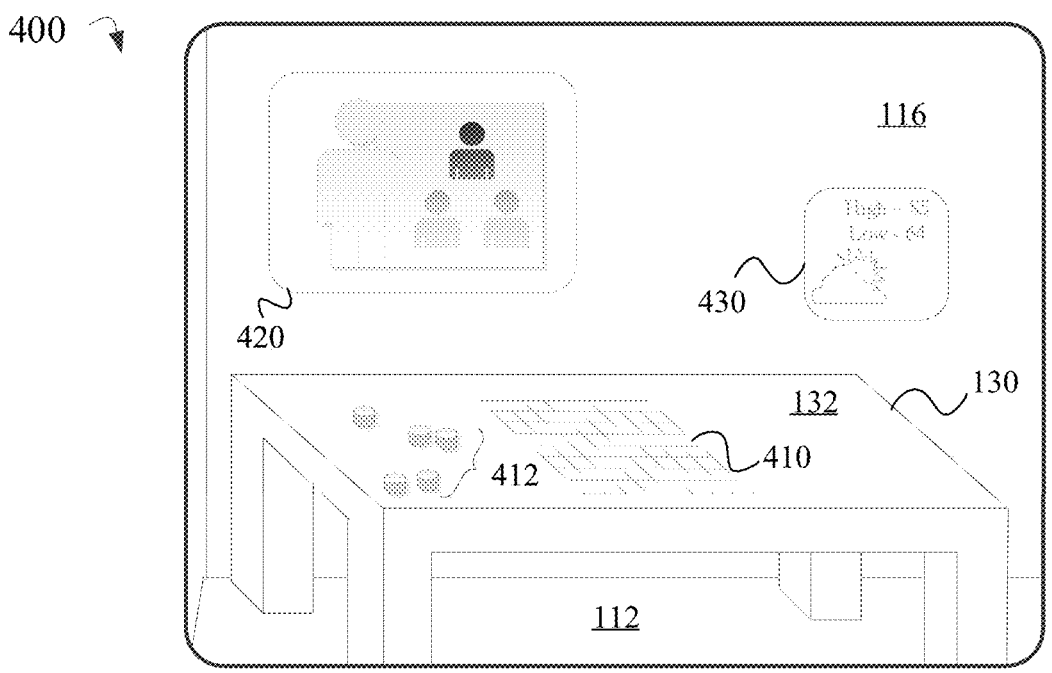
FIG. 4 illustrates an example of image data that an image pipeline derives from pixel events output by an event sensor, in accordance with some implementations.

A comparison between FIGS. 2 and 4 illustrates an example in which the elevated application receives access to a control parameter that modifies the ambience of the XR environment by adjusting an immersion level of the XR environment. In this example, the media application associated with representation 220 is again designated by the application interface unit as the elevated application while presenting content 200 of FIG. 2. Upon designating the media application as the elevated application, the application interface unit provides the media application with access to the control parameter that adjusts the immersion level of the XR environment.

In FIG. 2, a value of the control parameter may define a first inversion level in which a user may equally perceive both physical elements and virtual elements in the XR environment. User input received via the media application may change that value of the control parameter to a value that defines a second inversion level in which the user's ability to perceive virtual elements is reduced. Responsive to detecting that change to the value of the control parameter, the XR creation unit generates content 400 in which the immersion level of the XR environment is adjusted to the second immersion level. In content 400, the user's ability to perceive a representation 430 of the weather application is reduced relative to its representation 230 in content 200 while the user's ability to perceive depictions of physical elements (e.g., table 130) remains static. Other virtual elements of content 400, such as a representation 410 of the checkers application, associated computer-generated content 412, and a representation 420 of the media application are also less perceivable than their counterparts in content 200.

In the examples discussed above with respect to FIGS. 3 and 4, the application interface unit provides an elevated application with access to a control parameter that modifies aspects of the XR environment's ambience that generally pertain to the XR environment at large. The ambience of the XR environment that such control parameters modify may be referenced as "environmental ambience". In some implementations, the ambience unit exposes one or more user interface parameters that modify aspects of the XR environment's ambience that are more localized to a particular application among the multiple applications. The ambience of the XR environment that such user interface parameters modify may be referenced as "local ambience". Each user interface parameter is configured to modify a local ambience pertaining to portions of the XR environment occupied by a visual representation of the particular application or portions of the XR environment within a predefined proximity to that representation.

By way of example, the application interface unit may provide the weather application, as an elevated application, with access to a control parameter corresponding to an environmental audio ambience. In this example, the weather application may modify the control parameter to spatialize weather-related ambient sound (e.g., rainfall) all around a user in an XR environment. In an implementation, one or more non-elevated applications (e.g., the media application) may each spatialize audio from a respective direction of a corresponding representation concurrent with a modification of a control parameter corresponding to an environmental audio ambience.

As another example, the application interface unit may provide the weather application, as an active application, with access to a user interface parameter corresponding to a local audio ambience. In this example, the weather application may modify the user interface parameter to spatialize weather-related ambient sound (e.g., rainfall) from a direction of its corresponding representation in an XR environment. In an implementation, one or more non-active applications (e.g., the media application) may each spatialize audio from a respective direction of a corresponding representation concurrent with a modification of a user interface parameter corresponding to an local audio ambience.

In implementations with user interface parameters configured to modify local ambiences, another aspect of arbitrating control access involves the application interface unit designating a particular application among the multiple applications as an active application. In one implementation, the active application is identified by the application interface unit based on a detected location of a user position within the XR environment. In one implementation, the active application is identified by the application interface unit responsive to receiving user input that designates the particular application as the active application. In one implementation, the active application is identified by the application interface unit responsive to detecting an ongoing interaction between the particular application and a user.

Upon designating the particular application as the active application, the application interface unit provides the particular application with access to a user interface parameter configured to modify a local ambience of the XR environment. While the particular application is designated as the active application, the application interface unit precludes other applications among the multiple applications from accessing the user interface parameter. For example, the application interface unit may provide the particular application with read-write access to the user interface parameter while providing the other applications with no access or read-only access to the user interface parameter. In one implementation, an active application is provided with exclusive access to the user interface parameter.

In one implementation, designating the particular application as the active application alters routing decisions of a user input detection process concerning user input among the multiple applications. For example, the application inter-face unit may designate a first application among the multiple applications as the active application. In this example, the user input detection process may route user input (e.g., gaze tracking data, selection gesture data, and the like) to a second application of the multiple applications prior to the first application being designated as the active application. However, subsequent to the first application being designated as the active application, the user input detection process may route such user input to the first application. In one implementation, the application interface unit comprises the user input detection process.

Figure 5:
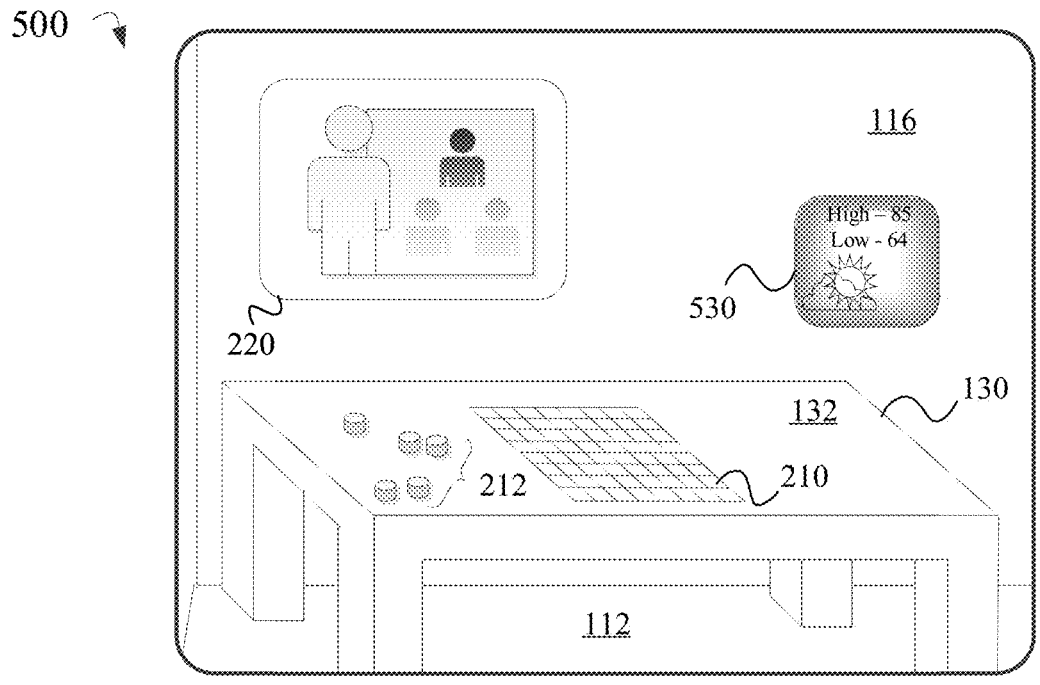
FIG. 5 illustrates an example of a stateless approach for processing pixel events output by an event sensor.

A comparison between FIGS. 2 and 5 illustrates an example in which an active application receives access to a user interface parameter that modifies a local ambience of the XR environment. In this example, the weather application associated with representation 230 is designated by the application interface unit as the active application while presenting content 200 of FIG. 2. Upon designating the weather application as the active application, the application interface unit provides the weather application with access to the user interface parameter that modifies the local ambience of the XR environment.

In FIG. 2, a value of the user interface parameter may define a first state in which the lighting condition of representation 230 comprises a maximum brightness level. User input received via the weather application may change that value of the user interface parameter to a value that defines a second state in which the lighting condition of representation 230 comprises a minimum brightness level. Responsive to detecting that change to the value of the user interface parameter, the XR creation unit generates content 500 in which the lighting condition of that representation of the weather application is adjusted to the second state, as illustrated by representation 530. Of note, the local ambience of the XR environment in the example of FIG. 5 is modified without modifying the environmental ambience of the XR environment.

Figure 6:
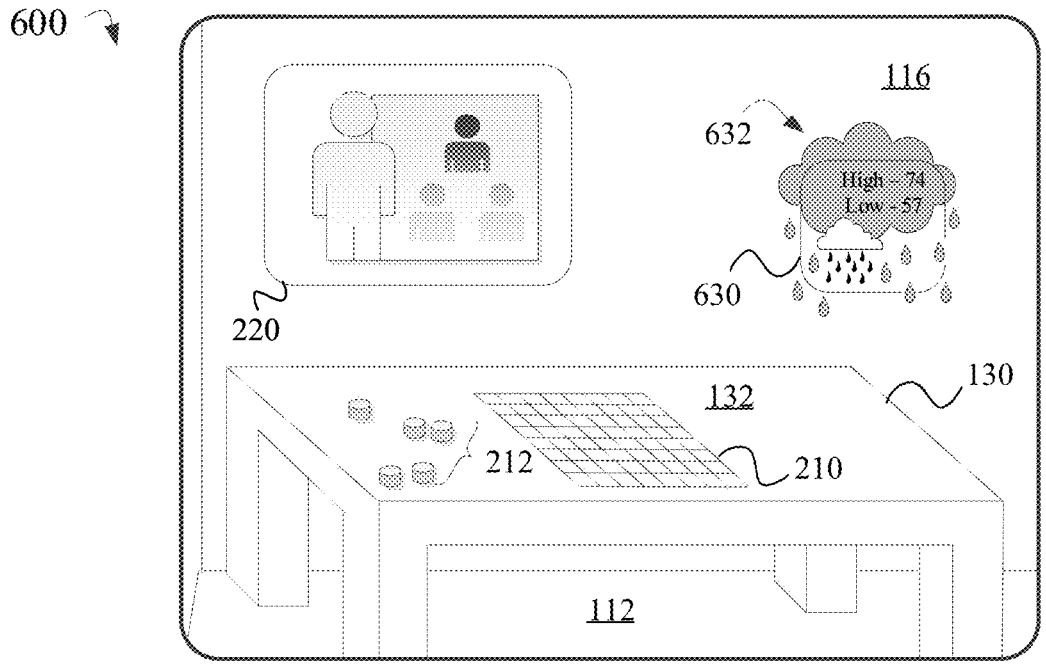
FIG. 6 illustrates a comparison between example functional block diagrams of stateless and stateful processes.

A comparison between FIGS. 5 and 6 illustrates an example in which an active application receives access to a user interface parameter that is configured to modify a local ambience of the XR environment based on a functionality provided by the active application. In this example, the application interface unit provides the weather application with access to the user interface parameter that modifies the local ambience of the XR environment based on the functionality provided by the active application. While presenting content 500 of FIG. 5, the weather application receives weather data indicative of a weather forecast change. In accordance with a functionality provided by the weather application, its representation is updated to reflect the weather forecast change, as illustrated by representation 630.

In FIG. 5, a value of the user interface parameter may define a first state in which a portion of the XR environment within a predefined distance of representation 530 is populated with image data depicting scene 110. In an implementation, the image data depicting scene 110 is obtained using an image sensor (e.g., an image sensor within the image sensory system 1012 of FIG. 10) of electronic device 120. In FIG. 6, user input received via the weather application may change that value of the user interface parameter to a value that defines a second state in which the portion of the XR environment within that predefined distance is populated with computer-generated content corresponding to the functionality provided by the weather application. Responsive to detecting that change to the value of the control parameter, the XR creation unit generates computer-generated content 632.

Figure 7:
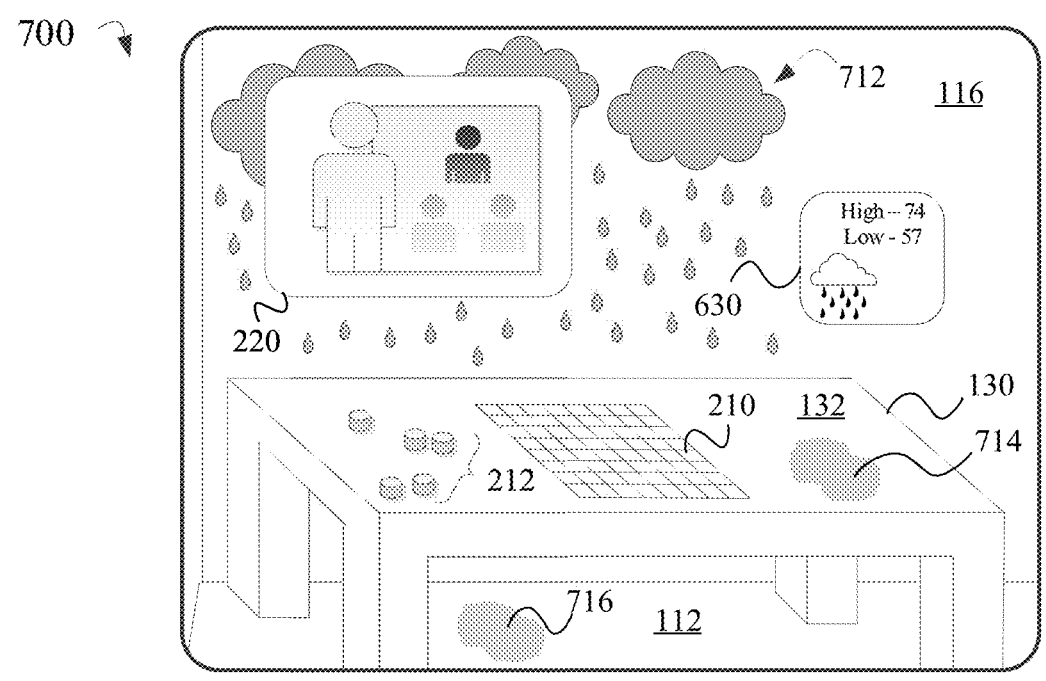
FIG. 7 illustrates an example of a stateful approach for processing pixel events output by an event sensor.

A comparison between FIGS. 6 and 7 illustrates an example in which a particular application among multiple applications may concurrently be designated as an active application and an elevated application. In this example, the weather application associated with representation 630 is again designated by the application interface unit as the active application while presenting content 600 of FIG. 6. Moreover, this example presumes that the media application associated with representation 220 remains designated as the elevated application, as discussed above with reference to FIG. 2. While presenting content 600, the application interface unit may designate the weather application as both the active application and the elevated application. For example, the application interface unit may reevaluate the one or more identification criterion discussed above with reference to FIG. 2 and designate the weather application as the elevated application responsive to that reevaluation.

Upon designating the weather application as the elevated application, the application interface unit provides the weather application with access to the control parameter that adjusts the lighting condition of the XR environment. In one implementation, the application interface unit removes access to the control parameter by the media application while the weather application is designated as the elevated application. In this example, the application interface unit provides the weather application with access to a control parameter configured to modify an appearance of one or more portions of the XR environment upon designating the weather application as the elevated application. In one implementation, other applications (e.g., the media application and the chess application) are precluded or restricted from modifying the one or more portions of the XR environment while the weather application is designated as the elevated application.

In FIG. 6, a value of the control parameter configured to modify the appearance of the one or more portions of the XR environment may define a first state in which that portion is populated with image data depicting scene 110. In an implementation, the image data depicting scene 110 is obtained using an image sensor (e.g., an image sensor within the image sensory system 1012 of FIG. 10) of electronic device 120. In FIG. 7, user input received via the weather application may change that value of the control parameter to a value that defines a second state in which that portion of the XR environment is populated with computer-generated content. In one implementation, the computer-generated content corresponds to a functionality provided by the elevated application. Responsive to detecting that change to the value of the control parameter, the XR creation unit generates computer-generated content 712, 714, and 716.

In one implementation, user input received via a particular application among multiple applications concurrently designated as an active application and an elevated application may modify both a local ambience associated with the particular application and an environmental ambience. For example, the user input discussed above with respect to FIG. 7 that updates the value of the control parameter may also update the value of the user interface parameter discussed above with respect to FIG. 6. In this instance, responsive to detecting that change to the respective values of the control parameter and the user interface parameter, the XR creation unit may also generate computer-generated content 632 and overlay representation 630 in content 700 with computer-generated content 632. As a result, that user input may modify both a local ambience associated with the weather application and an environmental ambience of the XR environment represented by content 700.

Figure 8:
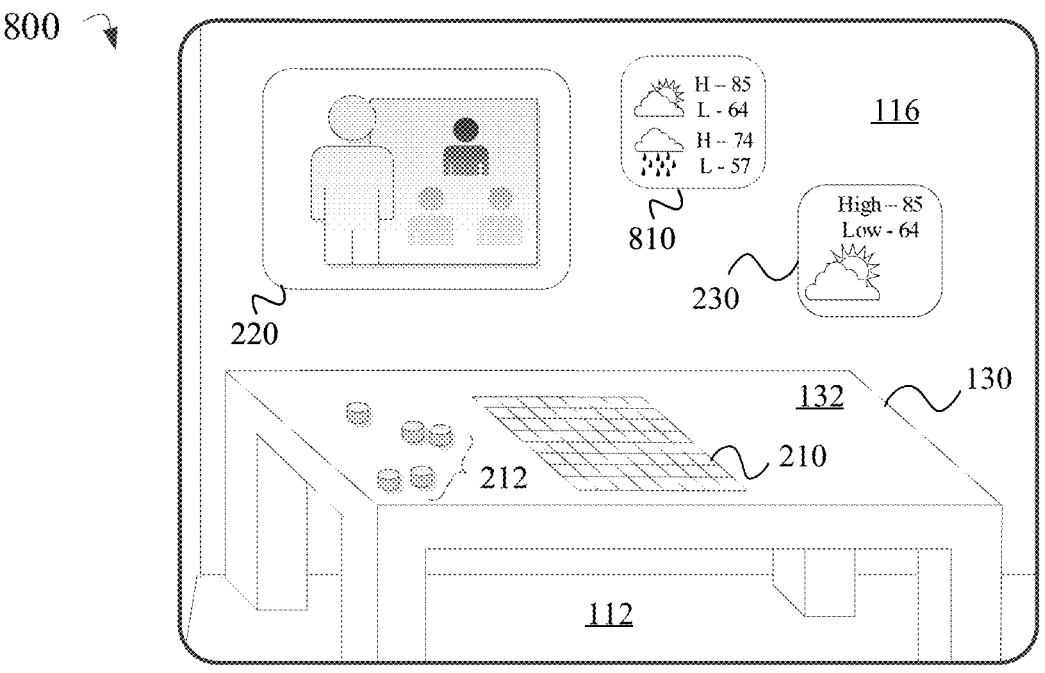
FIG. 8 illustrates an example of a stateful approach of gaze tracking using pixel events output by an event sensor.

A comparison between FIGS. 2 and 8 illustrates an example in which a particular application designated as an active application is provided with supplementary access to another application. In this example, the weather application associated with representation 230 is designated by the application interface unit as the active application while presenting content 200 of FIG. 2. Upon designating the weather application as the active application, the application interface unit provides the weather application with supplementary access to another application. For example, the application interface unit may direct user input received via the weather application to an application programming interface (API) of a reference application, such as a search application.

In FIG. 2, user input indicative of a search query concerning an extended weather forecast may be received via the weather application while presenting content 200. Responsive to detecting the user input, the application interface unit may direct the user input to the API of the reference application. Upon receiving the user input at the API, the reference application may transition from an unlaunched state to a launched state and direct the search query to a search engine associated with the reference application. When the reference application receives a corresponding search response, the XR creation unit generates content 800, in which a representation 810 of the reference application is populated with data obtained in the corresponding search response.

FIG. 9 is a flowchart illustrating an exemplary method 900 of providing a view of an XR environment, according to some implementations. In some implementations, the method 900 is performed by a device (e.g., electronic device 120 of FIG. 1). The method 900 may be performed at a mobile device, HMD, desktop, laptop, server device, or by multiple devices in communication with one another. In some implementations, the method 900 is performed by processing logic, including hardware, firmware, software, or a combination thereof. In some implementations, the method 900 is performed by a processor executing code stored in a non-transitory computer-readable medium (e.g., a memory).

At block 902, the method 900 includes presenting, at an electronic device, content representing a view of an XR environment on a display of the electronic device. The XR environment comprising visual representations corresponding to a plurality of applications. At block 904, the method 900 includes designating a first application among the plurality of applications as an elevated application. In one implementation, designating the first application as the elevated application comprises identifying the first application based on a default configuration, a priority setting, a user preference, a user input, a characteristic of the first application, a current context of the XR environment, a current context of a physical environment proximate to the electronic device, or a combination thereof. In one implementation, designating the first application as the elevated application alters routing decisions of a user input detection process among the plurality of applications.

At block 906, the method 900 includes providing the elevated application with access to a control parameter configured to modify an ambience of the XR environment. In one implementation, the control parameter is configured to modify the ambience by adjusting a lighting condition of the XR environment from a first state to a second state. In one implementation, the control parameter is configured to modify an appearance of a portion of the XR environment. In one implementation, other applications among the plurality of applications are precluded from modifying the appearance of the portion of the XR environment while the first application is designated as the elevated application. In one implementation, the control parameter is configured to modify the ambience by adjusting an immersion level of the XR environment from a first level to a second level.

At block 908, the method 900 includes precluding other applications of the plurality of applications from accessing the control parameter while the first application is designated as the elevated application. In one implementation, the elevated application has exclusive access to the control parameter. In one implementation, any conflicts arising among the plurality of applications related to the control parameter are resolved based on which of the plurality of applications is designated as the elevated application.

In one implementation, method 900 further includes modifying the ambience of the XR environment based on user input received via the elevated application. In one implementation, method 900 further includes designating a second application among the plurality of applications as the elevated application. In one implementation, method 900 further includes providing the second application with access to the control parameter responsive to designating the second application as the elevated application. In one implementation, method 900 further includes removing access to the control parameter by the first application while the second application is designated as the elevated application.

In one implementation, method 900 further includes designating a third application among the plurality of applications as an active application. In one implementation, method 900 further includes providing the active application with access to a user interface parameter configured to modify a functionality provided by the active application. In one implementation, method 900 further includes precluding other applications of the plurality of applications from accessing the user interface parameter while the third application is designated as the active application. In one implementation, designating the third application as the active application alters routing decisions of a user input detection process among the plurality of applications. In one implementation, the active application is identified based on a detected location of a user position within the XR environment.

In one implementation, the ambience is an environmental ambiance and method 900 further comprises modifying a local ambience of a visual representation of the third application based on user input received via the third application without modifying the environmental ambience. In one implementation, method 900 further includes designating the third application as the elevated application and the method further comprises modifying both the local ambience of the visual representation of the third application and the environmental ambience based on user input received via the third application.

Figure 10:
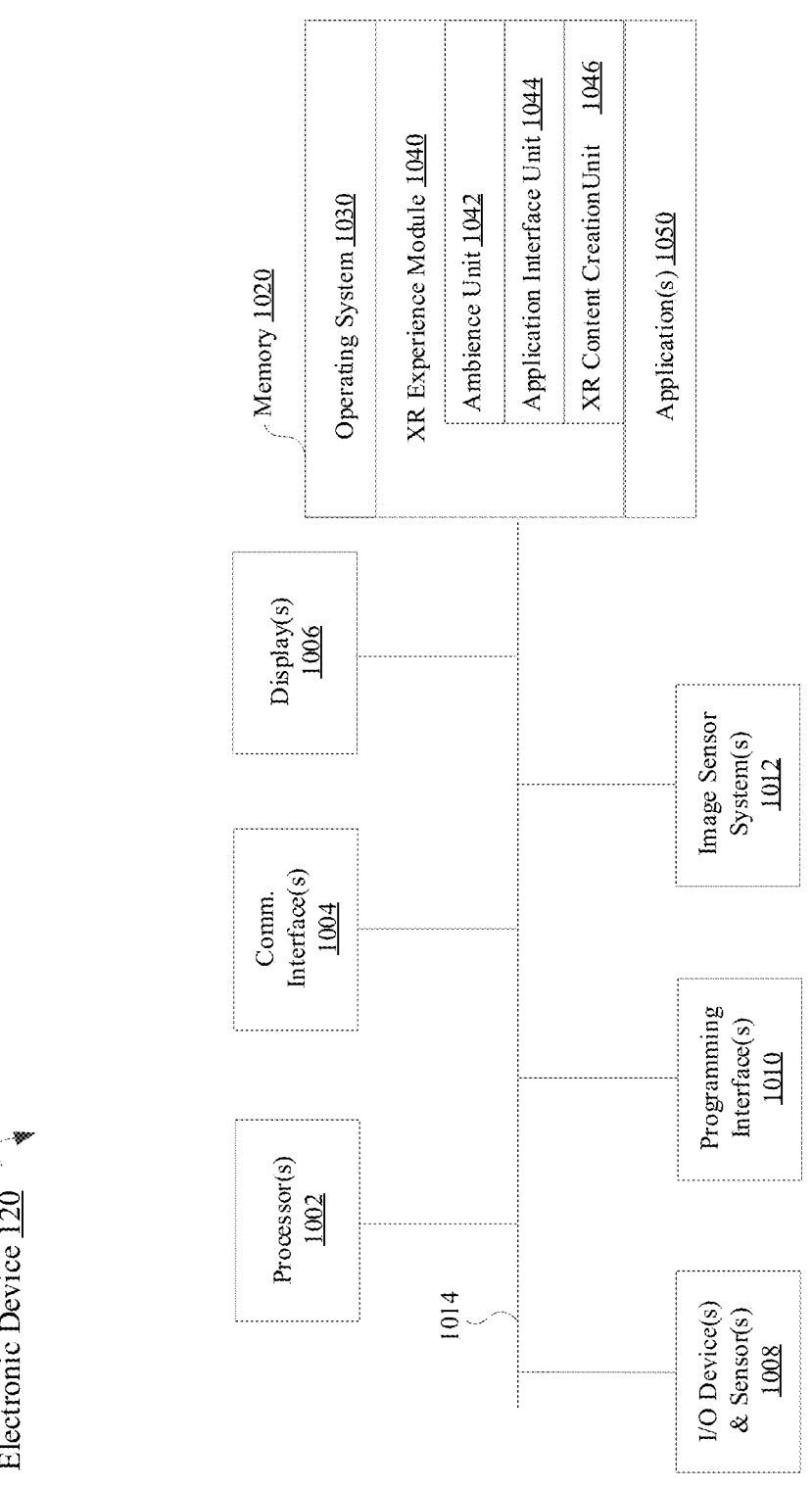
FIG. 10 is a block diagram of an example electronic device, in accordance with some implementations.

FIG. 10 is a block diagram of an example electronic device 120 in accordance with some implementations. While certain specific features are illustrated, those skilled in the art will appreciate from the subject matter disclosed herein that various other features have not been illustrated for the sake of brevity, and so as not to obscure more pertinent aspects of the implementations disclosed herein. To that end, as a non-limiting example, in some implementations electronic device 120 includes one or more processors 1002 (e.g., microprocessors, ASICs, FPGAs, GPUs, CPUs, processing cores, or the like), one or more communication interfaces 1004 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more displays 1006, one or more I/O devices and sensors 1008, one or more programming (e.g., I/O) interfaces 1010, one or more image sensor systems 1012, a memory 1020, and one or more communication buses 1014 for interconnecting these and various other components.

In some implementations, the one or more communication interfaces 1004 can include any device or group of devices suitable for establishing a wired or wireless data or telephone connection to one or more networks. Non-limiting examples the one or more communication interfaces 1004 include a network interface, such as an Ethernet network adapter, a modem, or the like. A device coupled to the one or more communication interfaces 1004 can transmit messages to one or more networks as electronic or optical signals.

In some implementations, the one or more displays 1006 are configured to present a user interface. In some implementations, the one or more displays 1006 correspond to holographic, digital light processing ("DLP"), liquid-crystal display ("LCD"), liquid-crystal on silicon ("LCoS"), organic light-emitting field-effect transitory ("OLET"), organic light-emitting diode ("OLED"), surface-conduction electron-emitter display ("SED"), field-emission display ("FED"), quantum-dot light-emitting diode ("QD-LED"), micro-electromechanical system ("MEMS"), or the like display types. In some implementations, the one or more displays 1006 correspond to diffractive, reflective, polarized, holographic, etc. waveguide displays. In one example, the electronic device 120 includes a single display. In another example, the electronic device 120 includes a display for each eye. In some implementations, the one or more displays 1006 are capable of presenting XR content.

In some implementations, the one or more I/O devices and sensors 1008 are configured to provide a human to machine interface exchanging commands, requests, information, data, and the like, between electronic device 120 and a user. To that end, the one or more I/O devices 1008 can include, but are not limited to, a keyboard, a pointing device, a microphone, a joystick, and the like. In some implementations, the one or more I/O devices and sensors 1008 are configured to detect or measure a physical property of an environment proximate to electronic device 120. To that end, the one or more I/O devices 1008 can include, but are not limited to, an IMU, an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more programming (e.g., I/O) interfaces 1010 are configured to communicatively couple the one or more I/O devices 1008 with other components of electronic device 120. As such, the one or more programming interfaces 1010 are capable of accepting commands or input from a user via the one or more I/O devices 1008 and transmitting the entered input to the one or more processors 1002.

In some implementations, the one or more image sensor systems 1012 are configured to obtain image data that corresponds to at least a portion of a scene local to electronic device 120. The one or more image sensor systems 1012 can include one or more RGB cameras (e.g., with a complimentary metal-oxide-semiconductor ("CMOS") image sensor or a charge-coupled device ("CCD") image sensor), monochrome camera, IR camera, event-based camera, or the like. In various implementations, the one or more image sensor systems 1012 further include illumination sources that emit light, such as a flash.

The memory 1020 can include any suitable computer-readable medium. A computer readable storage medium should not be construed as transitory signals per se (e.g., radio waves or other propagating electromagnetic waves, electromagnetic waves propagating through a transmission media such as a waveguide, or electrical signals transmitted through a wire). For example, the memory 1020 may include high-speed random-access memory, such as DRAM, SRAM, DDR RAM, or other random-access solid-state memory devices. In some implementations, the memory 1020 includes non-volatile memory, such as one or more magnetic disk storage devices, optical disk storage devices, flash memory devices, or other non-volatile solid-state storage devices. The memory 1020 optionally includes one or more storage devices remotely located from the one or more processing units 1002. The memory 1020 comprises a non-transitory computer readable storage medium. Instructions stored in the memory 1020 may be executed by the one or more processors 1002 to perform a variety of methods and operations, including the technique for presenting a view of an XR environment comprising visual representations of multiple applications described in greater detail above.

In some implementations, the memory 1020 or the non-transitory computer readable storage medium of the memory 1020 stores the following programs, modules and data structures, or a subset thereof including an optional operating system 1030, an XR experience module 1040, and one or more applications 1050. In one implementation, the one or more applications 1050 may include any combination of the applications discussed above with respect to FIGS. 2-8. For example, the one or more applications may include: the checkers application, the media application, the weather application, and/or the reference application. The operating system 1030 includes procedures for handling various basic system services and for performing hardware dependent tasks.

In some implementations, the XR experience module 1040 is configured to create, edit, present, or experience XR environments. To that end, in various implementations, the XR experience module 1040 includes an ambience unit 1042, an application interface unit 1044, and an XR content creation unit 1046.

In some implementations, the ambience unit 1042 facilitates customization of an ambience of an XR environment presented to a user. In one implementation, the ambience unit 1042 facilitates such customization by exposing one or more control parameters for modifying an ambience of the XR environment to multiple applications associated with or providing content corresponding to the XR environment. In one implementation, the ambience unit 1042 facilitates such customization by exposing one or more user interface parameters configured to modify a local ambience of the XR environment. To that end, in various implementations, the ambience unit 1042 includes instructions or logic therefor, and heuristics and metadata therefor.

In some implementations, the application interface unit 1044 is configured to designate a particular application among multiple applications as an elevated application and provide the elevated application with access to a control parameter. In one implementation, the application interface unit 1044 is configured to designate a particular application among the multiple applications as an active application and provide the active application with access to a user interface parameter. To that end, in various implementations, the application interface unit 1044 includes instructions and/or logic therefor, and heuristics and metadata therefor.

In some implementations, the XR content creation unit 1046 is configured to generate content representing a view of an XR environment. In one implementation, the XR content creation unit 1046 is configured to generate content that modifies an environmental ambience of the XR environment responsive to detecting a change in a value of a control parameter. In one implementation, the XR content creation unit 1046 is configured to generate content that modifies a local ambience of the XR environment responsive to detecting a change in a value of a user interface parameter. To that end, in various implementations, the XR content creation unit 1046 includes instructions or logic therefor, and heuristics and metadata therefor.

Although the ambience unit 1042, the application interface unit 1044, and the XR content creation unit 1046 are shown as residing on a single device (e.g., electronic device 120), it should be understood that in other implementations, any combination of the ambience unit 1042, the application interface unit 1044, and the XR content creation unit 1046 may be located in separate computing devices.

FIG. 10 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 10 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device with a display:
   presenting a view of an environment on the display, the view comprising a first visual representation of content provided by a first application and a second visual representation of content provided by a second application of a plurality of applications;
   designating the first application as an elevated application of the plurality of applications;
   providing the elevated application with access to modify content associated with the view of the environment is outside of the first visual representation of the content provided by the elevated application; and
   precluding the second application and any other application of the plurality of applications from modifying the content associated with the view of the environment outside of the second visual representation of the content provided by the second application while the first application is designated as the elevated application.

2. The method of claim 1, further comprising:
   modifying the content associated with the view of the environment based on user input received via the first application.

3. The method of claim 1, wherein providing the elevated application with access to modify the content associated with the view of the environment outside of the first visual representation of the content provided by the elevated application comprises identifying the first application based on a default configuration, a priority setting, a user preference, a user input, a characteristic of the first application, a current context of the environment, a current context of a physical environment proximate to the electronic device, or a combination thereof.

4. The method of claim 1, wherein modifying the content associated with the view of the environment outside of the first visual representation of the content comprises modifying an ambience of the content associated with the view of the environment.

5. The method of claim 4, wherein modifying the ambience of the content associated with the view of the environment comprises adjusting a lighting condition of the environment from a first state to a second state.

6. The method of claim 1, wherein modifying the content associated with the view of the environment comprises adjusting an immersion level of the environment from a first level to a second level.

7. The method of claim 1, further comprising:
   determining to designate the second application as the elevated application with access to enable the second application to modify the content associated with the view of the environment outside of the second visual representation of the content provided by the second application;
   removing designation of the first application as the elevated application and to preclude the first application to modify the content associated with the view of the environment outside of the first visual representation of the content provided by the first application; and
   designating the second application as the elevated application with access to enable the second application to modify the content associated with the view of the environment outside of the second visual representation of the content provided by the second application responsive to determining to designate the second application with access.

8. The method of claim 1, wherein designating the first application as the elevated application with access to enable the first application to modify the content associated with the view of the environment outside of the first visual representation of the content provided by the first application comprises altering routing decisions of a user input detection process among a plurality of applications.

9. The method of claim 1, further comprising:
   designating a third application as the elevated application;
   providing the elevated application with access to a user interface parameter configured to modify a functionality provided by the elevated application; and
   precluding remaining applications from accessing the user interface parameter while the third application is designated as the elevated application.

10. The method of claim 9, wherein the elevated application is identified based on a detected location of a user position within the environment.

11. The method of claim 9, further comprising:
    modifying a third visual representation of the content provided by the third application based on user input received via the third application without modifying the first visual representation associated with the first application.

12. The method of claim 11, further comprising:
    designating the third application as the elevated application with access to enable the third application to modify the content associated with the view of the environment outside of the third visual representation of the content provided by the third application; and
    modifying an ambience associated with the third visual representation of the content provided by the third application and modifying an ambience associated with the first visual representation associated with the first application based on user input received via the third application.

13. The method of claim 1, wherein modifying the content associated with the view of the environment outside of the first visual representation of the content provided by the first application comprises modifying an environmental audio ambience by spatializing ambient sound around a user position in the environment.

14. The method of claim 1, wherein modifying the content associated with the view of the environment outside of the first visual representation of the content provided by the first application comprises modifying an environmental audio ambience by spatializing audio from a respective direction of a corresponding application with access to modify the content associated with the view of the environment.

15. A system comprising:

an electronic device with a display;

a processor; and a computer-readable storage medium comprising instructions that upon execution by the processor cause the processor to perform operations, the operations comprising:

presenting a view of an environment on the display, the view comprising a first visual representation of content provided by a first application and a second visual representation of content provided by a second application of a plurality of applications;

designating the first application as an elevated application of the plurality of applications;

providing the elevated application with access to modify content associated with the view of the environment is outside of the first visual representation of the content provided by the elevated application; and precluding the second application and any other application of the plurality of applications from modifying the content associated with the view of the environment outside of the second visual representation of the content provided by the second application while the first application is designated as the elevated application.

16. The system of claim 15, wherein the instructions that upon execution by the processor further cause the processor to perform the operations:

modifying the content associated with the view of the environment based on user input received via the first application.

17. The system of claim 15, wherein providing the elevated application with access to modify the content associated with the view of the environment outside of the first visual representation of the content provided by the elevated application comprises identifying the first application based on a default configuration, a priority setting, a user preference, a user input, a characteristic of the first application, a current context of the environment, a current context of a physical environment proximate to the electronic device, or a combination thereof.

18. The system of claim 15, wherein the instructions that upon execution by the processor further cause the processor to perform the operations:

modifying an ambience of the content associated with the view of the environment by adjusting a lighting condition of the environment from a first state to a second state.

19. A non-transitory computer-readable storage medium, storing program instructions executable by a processor to perform operations comprising:

presenting a view of an environment on a display, the view comprising a first visual representation of content provided by a first application and a second visual representation of content provided by a second application of a plurality of applications;

designating the first application as an elevated application of the plurality of applications;

providing the elevated application with access to modify content associated with the view of the environment is outside of the first visual representation of the content provided by the elevated application; and precluding the second application and any other application of the plurality of applications from modifying the content associated with the view of the environment outside of the second visual representation of the content provided by the second application while the first application is designated as the elevated application.

* * * * *